(12) United States Patent
Nagata (10) Patent No.: US 12,264,735 B2
(45) Date of Patent: Apr. 1, 2025

(54) POWER TRANSMISSION DEVICE AND POWER UNIT EQUIPPED WITH SAME

(71) Applicant: TOYOTA JIDOSHA KABUSHIKI KAISHA, Toyota (JP)

(72) Inventor: Shohei Nagata, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/402,099

(22) Filed: Jan. 2, 2024

(65) Prior Publication Data

US 2024/0247711 A1 Jul. 25, 2024

(30) Foreign Application Priority Data

Jan. 20, 2023 (JP) ................................. 2023-007456

(51) Int. Cl.
| | |
|---|---|
| *F16H 57/04* | (2010.01) |
| *F16H 37/08* | (2006.01) |
| *F16H 57/037* | (2012.01) |
| *F16H 57/02* | (2012.01) |

(52) U.S. Cl.
CPC ..... *F16H 57/0423* (2013.01); *F16H 37/0813* (2013.01); *F16H 57/037* (2013.01); *F16H 57/045* (2013.01); *F16H 57/0471* (2013.01); *F16H 2057/02034* (2013.01); *F16H 2057/02052* (2013.01)

(58) Field of Classification Search
CPC ............... F16H 57/0423; F16H 57/045; F16H 57/0457; F16H 57/042; F16H 37/0813; F16H 57/037; F16H 57/0471; F16H 2057/02034; F16H 2057/02052; F16H 57/0483; F16H 57/023; F16H 2057/02043
See application file for complete search history.

(56) References Cited

U.S. PATENT DOCUMENTS

| | | | |
|---|---|---|---|
| 8,267,223 B2* | 9/2012 | Ideshio .................... | B60K 6/52 |
| | | | 184/6.12 |
| 8,931,596 B2* | 1/2015 | Shioiri ................ | F16H 57/0423 |
| | | | 184/6.12 |
| 10,746,282 B2* | 8/2020 | Ito ....................... | F16H 57/0471 |

(Continued)

FOREIGN PATENT DOCUMENTS

| | | |
|---|---|---|
| CN | 114829805 A | 7/2022 |
| DE | 10 2022 209 689 A1 | 3/2023 |

(Continued)

*Primary Examiner* — Thomas C Diaz
(74) *Attorney, Agent, or Firm* — Sughrue Mion, PLLC (57) ABSTRACT

A power transmission device includes a first gear, a second gear meshing with the first gear, a third gear that rotates integrally with the second gear, a fourth gear meshing with the third gear, a housing accommodating the first gear, the second gear, the third gear, and the fourth gear, and a plate member mounted in the housing. A lubricating liquid is stored in the housing so that a part of the second gear and a part of the fourth gear are immersed therein. The plate member includes a catch tank arranged adjacent to the first gear, and a tray extending from the catch tank along the second gear into the lubricating liquid. The catch tank receives the lubricating liquid drawn up by the fourth gear and guides the lubricating liquid to the meshing portion between the first gear and the second gear.

12 Claims, 5 Drawing Sheets

(56) References Cited

U.S. PATENT DOCUMENTS

| | | | |
|---|---|---|---|
| 10,781,909 B2 | 9/2020 | Graves et al. | |
| 11,114,921 B2 | 9/2021 | Ito et al. | |
| 2010/0319486 A1* | 12/2010 | Kawamoto | F16H 57/0423 74/467 |
| 2013/0145879 A1* | 6/2013 | Nakamura | F16H 57/0441 74/467 |
| 2014/0054114 A1 | 2/2014 | Isomura et al. | |
| 2017/0097086 A1 | 4/2017 | Ono et al. | |
| 2023/0082913 A1 | 3/2023 | Nakamatsu et al. | |

FOREIGN PATENT DOCUMENTS

| | | | |
|---|---|---|---|
| DE | 10 2021 211 977 A1 | 4/2023 | |
| EP | 4 249 774 A1 | 9/2023 | |
| JP | 2001190042 A * | 7/2001 | ......... F16H 57/0428 |
| JP | 2017-067258 A | 4/2017 | |
| WO | WO-2023099121 A1 * | 6/2023 | ......... F16H 57/0409 |

* cited by examiner

POWER TRANSMISSION DEVICE AND POWER UNIT EQUIPPED WITH SAME

CROSS-REFERENCE TO RELATED APPLICATION

This application claims priority to Japanese Patent Application No. 2023-007456 filed on Jan. 20, 2023, incorporated herein by reference in its entirety.

BACKGROUND

1. Technical Field

The present disclosure relates to a power transmission device and a power unit equipped with same.

2. Description of Related Art

Japanese Unexamined Patent Application Publication No. 2017-067258 describes a power transmission device for a vehicle. The power transmission device has a plurality of gears and a housing that accommodates the gears. A lubricating liquid is stored in the lower part of the housing, and the lubricating liquid that is drawn up by one or the gears is supplied to other gears.

SUMMARY

In the above-described power transmission device, a plurality of parts such as a baffle plate, a catch tank, and a pipe are provided inside a casing. These parts are useful for controlling the flow of the lubricating liquid, but increase the number of parts for the power transmission device. The present disclosure provides a power transmission device capable of appropriately controlling the flow of lubricating liquid while reducing the number of parts of the power transmission device, and a power unit including the power transmission device.

A first aspect of the disclosure relates to a power transmission device including a first gear, a second gear, a third gear, a fourth gear, a housing, and a plate member. The second gear meshes with the first gear. The third gear rotates integrally with the second gear. The fourth gear meshes with the third gear. The housing accommodates the first gear, the second gear, the third gear, and the fourth gear. The plate member is mounted in the housing. A lubricating liquid is stored in the housing so that a part of the second gear and a part of the fourth gear are immersed therein. The plate member includes a catch tank arranged adjacent to the first gear, and a tray extending from the catch tank along the second gear into the lubricating liquid. The catch tank is configured to receive the lubricating liquid drawn up by the fourth gear and guide the lubricating liquid to a meshing portion between the first gear and the second gear.

With the configuration, the catch tank arranged adjacent to the first gear receives the lubricating liquid drawn up by the fourth gear and guides it to the meshing portion between the first gear and the second gear. In addition, the tray arranged along the second gear guides the lubricating liquid drawn up by the second gear to the meshing portion between the first gear and the second gear. Thus, the lubricating liquid is supplied from two directions to the meshing portions between the first gear and the second gear, thereby effectively lubricating and cooling the meshing portion. In addition, since the catch tank and the tray are made up of an integrated plate member, it is possible to reduce the number of parts required for the power transmission device.

In the first aspect, the fourth gear may be located on one side with respect to the meshing portion between the first gear and the second gear in a horizontal direction, and the plate member may be adjacent to the meshing portion between the first gear and the second gear from the other side in the horizontal direction.

With the configuration, one side of the meshing portion is directly supplied with the lubricating liquid that is drawn up by the fourth gear. The other side of the meshing portion is supplied with the lubricating liquid that is drawn up by the fourth gear through the catch tank. In particular, on the other side of the meshing portion, since teeth of each gear rotate toward the meshing portion, the lubricating liquid is supplied to the meshing portion to effectively lubricate and cool the meshing portion.

In the first aspect, the catch tank may include a first catch tank located above the first gear and receiving the lubricating liquid drawn up by the fourth gear, and a second catch tank located below the first gear and guiding the lubricating liquid supplied from the first catch tank to the meshing portion.

With the configuration, the first catch tank can receive a large amount of lubricating liquid, and the second catch tank can reliably supply the lubricating liquid to the meshing portion.

In the first aspect, the first catch tank may have a first supply hole used to supply the lubricating liquid to the second catch tank. In this case, although not particularly limited thereto, the first supply hole may be provided in a bottom wall of the first catch tank. Moreover, two or more first supply holes may be provided in the first catch tank.

In the first aspect, the first supply hole may be located directly above the first gear.

With the configuration, the lubricating liquid can be directly supplied from the first catch tank to the first gear.

In the first aspect, the first catch tank may have a first compartment, a second compartment, and a partition wall that partially isolates the first compartment and the second compartment, and in this case, the first supply hole may be provided in the second compartment.

With the configuration, uneven distribution of the lubricating liquid in the first catch tank is avoided by the partition wall, and the lubricating liquid can be continuously supplied from the first supply hole to the second catch tank.

In the first aspect, the first catch tank may further include a second supply hole used to supply the lubricating liquid to a bearing supporting the first gear.

In the first aspect, the second catch tank may have a shape open toward the meshing portion.

With the configuration, the shape of the second catch tank can be simplified. However, as another aspect, the second catch tank may be provided with a hole or a conduit used to supply the lubricating liquid to the meshing portion.

In the first aspect, the catch tank may further include a vertical wall extending between the first catch tank and the second catch tank, and the vertical wall may face an outer peripheral surface of the first gear.

With the configuration, the lubricating liquid dispersed from the first gear is caught by the vertical wall and supplied to the second catch tank.

In the first aspect, the tray may extend in an arc shape from the second catch tank along an outer peripheral surface of the second gear.

With the configuration, the lubricating liquid guided by the second catch tank and the lubricating liquid guided by the tray are reliably supplied to the meshing portion between the first gear and the second gear.

A second aspect of the disclosure relates to a power unit including the power transmission device of the first aspect and an electric motor. The electric motor drives the first gear of the power transmission device.

In the second aspect, the fourth gear may be a ring gear of a differential unit.

With each aspect of the present disclosure, it is possible to appropriately control the flow of the lubricating liquid while reducing the number of parts of the power transmission device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Below, a representative and non-limiting specific example of the disclosure will be described in detail with reference to the drawings. This detailed description is merely intended to provide those skilled in the art with details for implementing a preferred embodiment of the disclosure, and is not intended to limit the scope of the disclosure. Further, the additional features and disclosures disclosed below can be used separately or in conjunction with other features and disclosures to provide further improved power transmission devices and power units with the power transmission devices.

Moreover, no combination of features or steps disclosed in the following detailed description is essential to the practice of the disclosure in its broadest sense, and specifically, it is set forth only to describe the representative specific example of the disclosure. Further, various features of the representative specific example described above and below, as well as those set forth in independent and dependent claims, are not required to be combined in the exact order in which they are listed or in the specific example presented herein to provide additional and useful embodiments of the present disclosure.

All features described in this specification and/or claims are intended to be disclosed individually and independently of each other as limitations to describe the original disclosure and claimed particular matter, apart from the configuration of features described in the example and/or claims. Further, all numerical ranges and groupings or populations are intended to disclose configurations intermediate therebetween as limitations on the original disclosure as well as the specific subject matter claimed.

Figure 1:
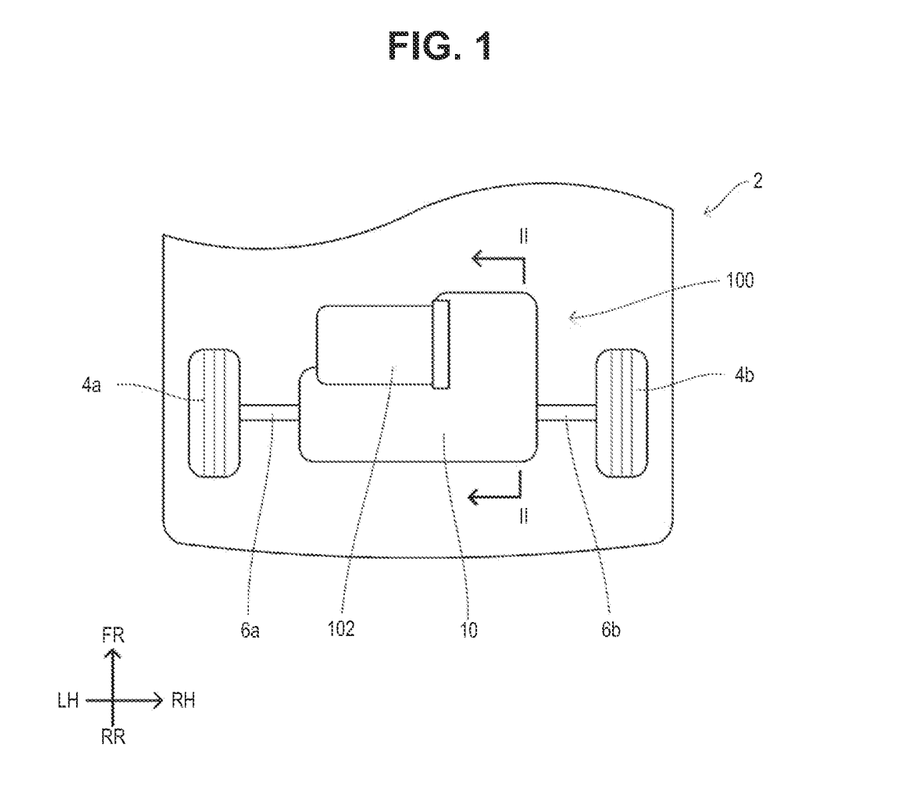
FIG. 1 schematically illustrates an electrified vehicle 2 employing a power transmission device 10 of an example.

A power transmission device 10 of an example and a power unit 100 incorporating the power transmission device 10 will be described with reference to the drawings. As illustrated in FIG. 1, although not particularly limited thereto, the power unit 100 is employed in an electrified vehicle 2 and drives a left wheel 4a and a right wheel 4b of the electrified vehicle 2. An electrified vehicle as used herein broadly means a vehicle having a motor that drives at least one wheel, and includes, for example, a battery electric vehicle, a hybrid electric vehicle, a plug-in hybrid electric vehicle, and a fuel cell electric vehicle.

Here, a direction FR in the drawing indicates the front of the electrified vehicle 2 in a front-rear direction, and a direction RR indicates the rear of the electrified vehicle 2 in the front-rear direction. A direction LH indicates the left side of the electrified vehicle 2 in a right and left direction, and a direction RH indicates the right side of the electrified vehicle 2 in the right and left direction. A direction UP indicates the upper side of the electrified vehicle 2 in an up and down direction, and a direction DW indicates the lower side of the electrified vehicle 2 in the up and down direction. Normally, the front-rear direction and the right and left direction of the electrified vehicle 2 are horizontal directions, and the up and down direction of the electrified vehicle 2 is a vertical direction.

The power unit 100 mainly includes an electric motor 102, the power transmission device 10 connected to the electric motor 102, and an inverter (not illustrated) that controls the electric motor 102. The power transmission device 10 is connected to the left wheel 4a via a left drive shaft 6a, and is connected to the right wheel 4b via a right drive shaft 6b. The power of the electric motor 102 is transmitted to the left wheel 4a and the right wheel 4b via the power transmission device 10. The left wheel 4a and the right wheel 4b referred to here may be the front wheels of the electrified vehicle 2 or the rear wheels of the electrified vehicle 2.

Figure 2:
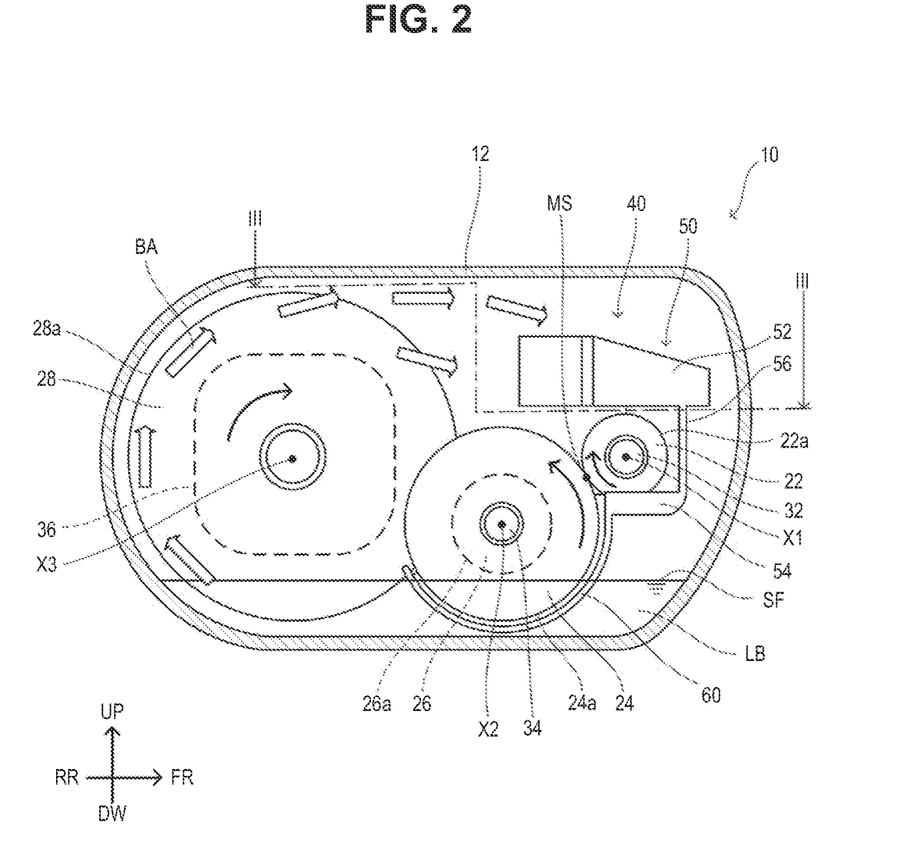
FIG. 2 illustrates a cross-sectional view taken along the line II-II in FIG. 1.
Figure 3:
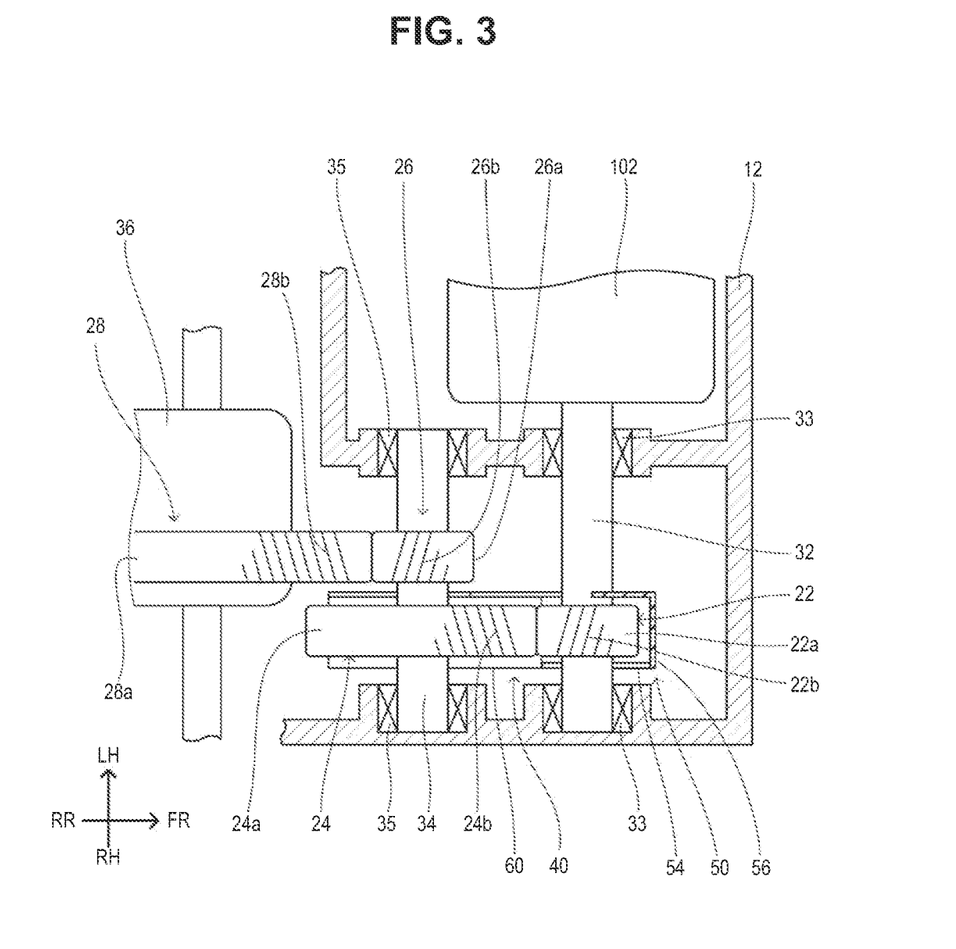
FIG. 3 illustrates a cross-sectional view taken along the line III-III in FIG. 2.

As illustrated in FIGS. 2 and 3, the power transmission device 10 includes a housing 12, a plurality of gears 22, 24, 26, 28, and a differential unit 36. The gears 22, 24, 26, 28 and the differential unit 36 are accommodated in the housing 12. The housing 12 is made of, but not limited to, a metal material. The gears 22, 24, 26, 28 include a drive gear 22, a first counter gear 24, a second counter gear 26, and a ring gear 28. The ring gear 28 is fixed to the differential unit 36 and forms part of the differential unit 36.

The drive gear 22 is an external gear. A plurality of teeth 22b are formed on an outer peripheral surface 22a of the drive gear 22. The drive gear 22 is provided on a drive shaft 32. The drive shaft 32 is arranged along a first rotation axis X1 extending in the right and left direction. The drive shaft 32 is attached to and rotatably supported by the housing 12 via a plurality of bearings 33. The drive shaft 32 is connected to the electric motor 102 and rotationally driven by the electric motor 102. The drive gear 22 is non-rotatably fixed to the drive shaft 32 and rotates together with the drive shaft 32. That is, the drive gear 22 is rotationally driven by the electric motor 102.

The first counter gear 24 and the second counter gear 26 are external gears. An outer peripheral surface 24a of the first counter gear 24 is formed with a plurality of teeth 24b, and the outer peripheral surface 26a of the second counter gear 26 is also formed with a plurality of teeth 26b. The first counter gear 24 and the second counter gear 26 are provided on a counter shaft 34. The counter shaft 34 is arranged along a second rotation axis X2 extending in the right and left direction. The counter shaft 34 is attached to and rotatably supported by the housing 12 via a plurality of bearings 35. The first counter gear 24 and the second counter gear 26 are fixed to the counter shaft 34, ensuring that they cannot rotate independently from, but rather must rotate together with, the counter shaft 34. The first counter gear 24 meshes with the drive gear 22. Therefore, when the drive gear 22 is rotationally driven by the electric motor 102, the first counter gear 24 and the second counter gear 26 rotate in a direction opposite to a rotational direction of the drive gear 22. The outer diameter of the first counter gear 24 is larger than the outer diameter of the drive gear 22. Therefore, a first deceleration (in other words, torque amplification) takes place between the drive shaft 32 and the counter shaft 34. The outer diameter of the second counter gear 26 is smaller than the outer diameter of the first counter gear 24.

The ring gear 28 is an external gear. A plurality of teeth 28b are formed on an outer peripheral surface 28a of the ring gear 28. As described above, the ring gear 28 is provided in the differential unit 36. The differential unit 36 is arranged along a third rotation axis X3 extending in the right and left direction. The differential unit 36 is attached to and rotatably supported by the housing 12 via a plurality of bearings (not illustrated). The ring gear 28 is non-rotatably fixed to the differential unit 36 and rotates together with the differential unit 36. The ring gear 28 meshes with the second counter gear 26. Therefore, when the second counter gear 26 rotates, the differential unit 36 including the ring gear 28 rotates in a direction opposite to a rotational direction of the second counter gear 26. The left wheel 4a and the right wheel 4b are connected to the differential unit 36 via the drive shafts 6a, 6b. The differential unit 36 distributes the torque received from the second counter gear 26 to the left wheel 4a and the right wheel 4b while absorbing the speed difference between the left wheel 4a and the right wheel 4b.

The inside of the housing 12 accommodates a lubricating liquid LB for lubricating and cooling the gears 22, 24, 26, 28. Although not particularly limited thereto, the lubricating liquid LB in this example is oil. The lubricating liquid LB is stored in the lower part of the housing 12, and a part of the first counter gear 24 and a part of the fourth gear are immersed in the lubricating liquid LB. That is, a part of the first counter gear 24 and a part of the fourth gear are positioned below a liquid surface SF of the lubricating liquid LB. On the other hand, the drive gear 22 is located above the liquid surface SF of the lubricating liquid LB, and a meshing portion MS between the drive gear 22 and the second gear is also located above the liquid surface SF of the lubricating liquid LB. As indicated by a plurality of block arrows BA in FIG. 2, when the ring gear 28 rotates, the ring gear 28 draws up the lubricating liquid LB. The lubricating liquid LB that has been drawn up disperses toward the drive gear 22, the first counter gear 24, and the second counter gear 26. As a result, the lubricating liquid LB is supplied to the drive gear 22, the first counter gear 24, and the second counter gear 26.

Figure 4:
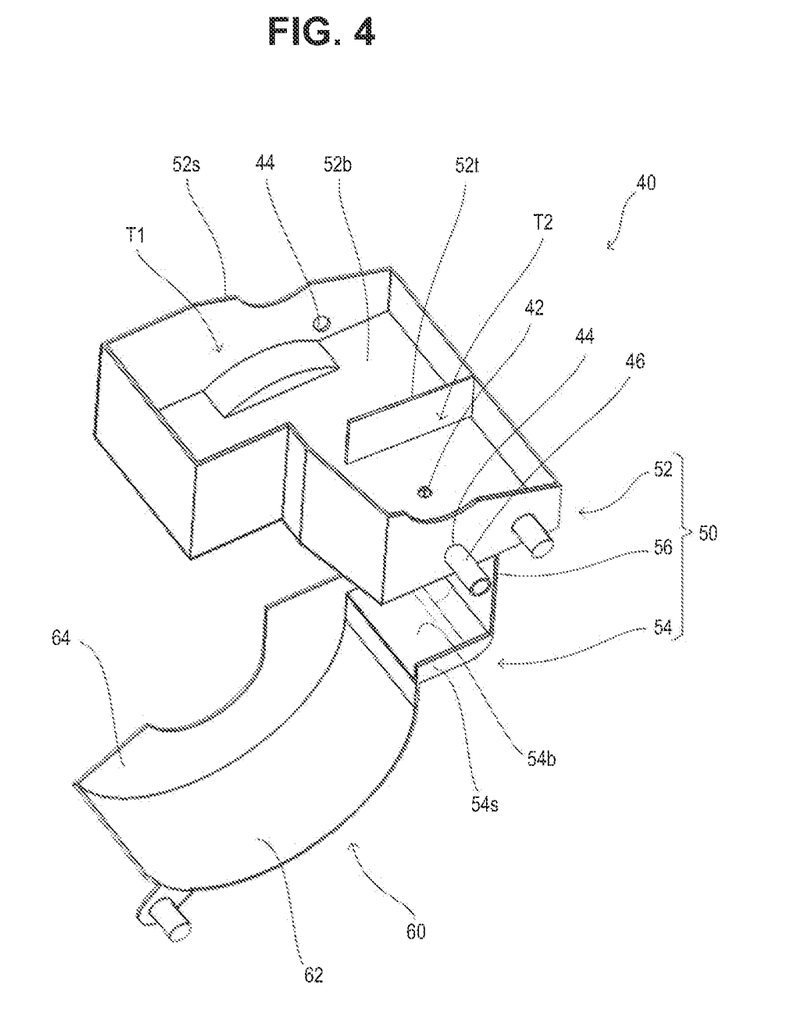
FIG. 4 is a perspective view illustrating a plate member 40 alone.

As illustrated in FIGS. 2 to 4, the power transmission device 10 further includes a plate member 40. The plate member 40 is accommodated inside the housing 12 and fixed to the housing 12. Although not particularly limited thereto, the plate member 40 in this example is a single member made of a resin material. However, the plate member 40 may have a structure in which a plurality of members are integrally combined.

Although the details will be described below, the plate member 40 is a member that used to supply the lubricating liquid LB to the meshing portion MS between the drive gear 22 and the first counter gear 24. The plate member 40 is adjacent to the meshing portion MS between the drive gear 22 and the first counter gear 24 when viewed from the front. On the other hand, the ring gear 28 that draws up the lubricating liquid LB is positioned behind the meshing portion MS between the drive gear 22 and the first counter gear 24. That is, with respect to the horizontal direction, the ring gear 28 is positioned on one side with respect to the meshing portion MS, and the plate member 40 is adjacent to the meshing portion MS when viewed from the other side.

The plate member 40 has a catch tank 50 and a tray 60. The catch tank 50 is positioned above the liquid surface SF of the lubricating liquid LB and is arranged adjacent to the drive gear 22. The catch tank 50 receives the lubricating liquid LB drawn up by the ring gear 28 and guides it to the meshing portion MS between the drive gear 22 and the first counter gear 24. As an example, the catch tank 50 in this example has a first catch tank 52, a second catch tank 54, and a vertical wall 56. The first catch tank 52 is positioned above the drive gear 22 and the second catch tank 54 is positioned below the drive gear 22. The vertical wall 56 extends from the first catch tank 52 to the second catch tank 54 and faces the outer peripheral surface 22a of the drive gear 22.

The first catch tank 52 receives the lubricating liquid LB that has been drawn up by the ring gear 28. The first catch tank 52 has a bottom wall 52b and a side wall 52s erected along the periphery of the bottom wall 52b. That is, the first catch tank 52 has a box shape with an open top. As a result, the first catch tank 52 can store the lubricating liquid LB drawn up by the ring gear 28. The first catch tank 52 is provided with a first supply hole 42 and two second supply holes 44. The first supply hole 42 is located in the bottom wall 52b of the first catch tank 52 and supplies the lubricating liquid LB stored in the first catch tank 52 to the second catch tank 54. The two second supply holes 44 are provided in the side wall 52s of the first catch tank 52 to supply the lubricating liquid LB stored in the first catch tank 52 to the two bearings 33 that support the drive shaft 32. Although not particularly limited thereto, conduits 46 that guide the lubricating liquid LB to the bearings 33 may be connected to the second supply holes 44.

The first catch tank 52 further has a partition wall 52t. The partition wall 52t is provided on the bottom wall 52b, and divides the first catch tank 52 into a first region T1 and a second region T2. However, the partition wall 52t partially separates the first region T1 and the second region T2, and the first region T1 and the second region T2 are connected to each other through a gap between the partition wall 52t and the side wall 52s. The first supply hole 42 described above is provided in the second region T2. When the first catch tank 52 is divided into a plurality of regions in this way, the uneven distribution of the lubricating liquid LB in the first catch tank 52 is avoided. As a result, the lubricating liquid LB is continuously supplied from the first supply hole 42 to the second catch tank 54.

The second catch tank 54 guides the lubricating liquid LB supplied from the first catch tank 52 to the meshing portion MS between the drive gear 22 and the first counter gear 24. The second catch tank 54 has a bottom wall 54b and a side wall 54s erected along the periphery of the bottom wall 54b. That is, the second catch tank 54 has a shallow box shape with an open top. However, the second catch tank 54 has a shape that opens toward the meshing portion MS between the drive gear 22 and the first counter gear 24, and is configured such that the lubricating liquid LB flows toward the meshing portion MS.

Next, the tray 60 will be described. The tray 60 extends from the second catch tank 54 along the first counter gear 24 into the lubricating liquid LB. By way of example, the tray 60 has a first portion 62 and a second portion 64. The first portion 62 of the tray 60 faces the outer peripheral surface 24a of the first counter gear 24 and extends in an arc shape. The second portion 64 of the tray 60 faces an end surface of the first counter gear 24 and extends planarly. The tray 60 functions as a baffle plate that avoids the flow of the lubricating liquid LB around the first counter gear 24. In addition, by extending to the second catch tank 54, the tray 60 also functions as a guide that guides the lubricating liquid LB drawn up by the first counter gear 24 to the meshing portion MS between the drive gear 22 and the first counter gear 24.

Figure 5:
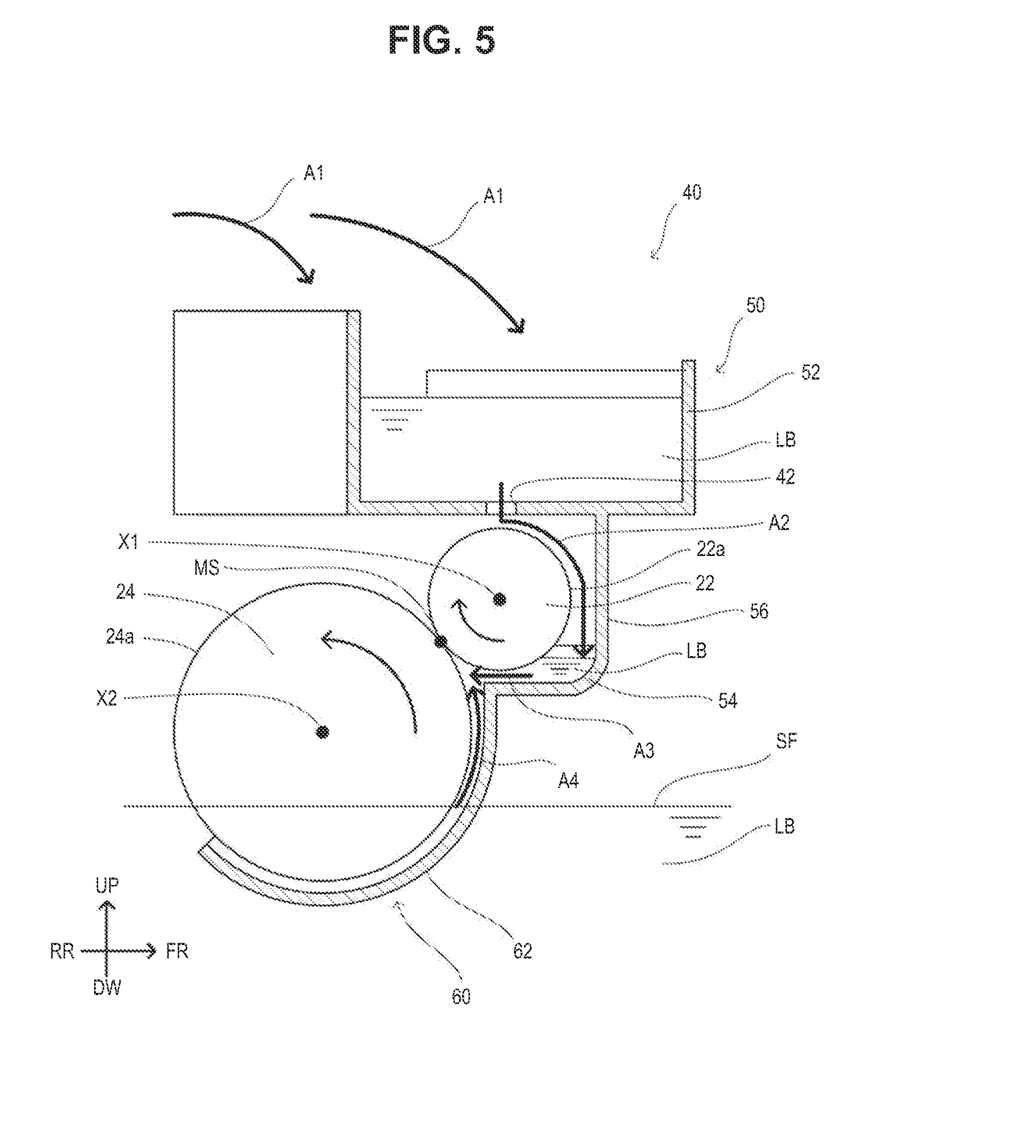
FIG. 5 schematically illustrates a flow of a lubricating liquid LB through the plate member 40.

With the above configuration, when the power transmission device 10 operates, the plate member 40 guides the lubricating liquid LB as illustrated in FIG. 5. That is, when the ring gear 28 rotates, the lubricating liquid LB in the housing 12 is drawn up by the ring gear 28. The lubricating liquid LB drawn up by the ring gear 28 disperses toward the first catch tank 52 and is received by the first catch tank 52 (see arrow A1 in FIG. 5). Thereby, the lubricating liquid LB is stored in the first catch tank 52. The lubricating liquid LB stored in the first catch tank 52 is supplied to the second catch tank 54 through the first supply hole 42 (see arrow A2 in FIG. 5).

Here, the first supply hole 42 may be positioned directly above the drive gear 22. With such a configuration, the lubricating liquid LB is directly supplied to the drive gear 22, and further lubrication and cooling of the drive gear 22 can be achieved. The lubricating liquid LB supplied to the drive gear 22 may disperse from the drive gear 22 as the drive gear 22 rotates. In this regard, the vertical wall 56 facing the outer peripheral surface 22a of the drive gear 22 is provided between the first catch tank 52 and the second catch tank 54. With such a configuration, the lubricating liquid LB dispersed from the drive gear 22 is collected by the vertical wall 56 and supplied to the second catch tank 54.

In the second catch tank 54, the lubricating liquid LB is guided toward the meshing portion MS between the drive gear 22 and the first counter gear 24 (see arrow A3 in FIG. 5). The second catch tank 54 is preferably constructed and arranged such that the lower end of the drive gear 22 is in contact with the lubricating liquid LB on the second catch tank 54. As a result, the rotation of the drive gear 22 can be used to supply the lubricating liquid LB on the second catch tank 54 to the meshing portion MS between the drive gear 22 and the first counter gear 24.

Further, in the tray 60, the lubricating liquid LB drawn up by the first counter gear 24 is guided toward the meshing portion MS between the drive gear 22 and the first counter gear 24 (see arrow A4 in FIG. 5). Thus, the meshing portion MS between the drive gear 22 and the first counter gear 24 is supplied with the lubricating liquid LB from two directions by both the catch tank 50 and the tray 60. This effectively lubricates and cools the meshing portion MS. Further, since the catch tank 50 and the tray 60 are integrally formed by the plate member 40, the number of parts required for the power transmission device 10 can be reduced.

In particular, in the power transmission device 10 of this example, as described above, the ring gear 28 that draws up the lubricating liquid LB is positioned on one side, such as the rear side, with respect to the meshing portion MS between the drive gear 22 and the first counter gear 24 in a horizontal direction. On the other hand, the plate member 40 is positioned on the other side, such as the front side, with respect to the meshing portion MS between the drive gear 22 and the first counter gear 24 in the horizontal direction. With such a configuration, on one side of the meshing portion MS, the lubricating liquid LB that is drawn up by the fourth gear is supplied directly from the ring gear 28. Also, on the other side of the meshing portion MS, the lubricating liquid LB that is drawn up by the ring gear 28 is supplied via the catch tank 50. In particular, on the other side of the meshing portion MS, the teeth 22b, 24b of the gears 22, 24 rotate toward the meshing portion MS. Therefore, by supplying the lubricating liquid LB to the meshing portion MS, lubrication and cooling are effectively facilitated.

The example described above is an example of the technology disclosed in this specification, and is not intended to limit the forms for carrying out the present technology. The drive gear 22 in this example is an example of the first gear in the present technology. The first counter gear 24 in this example is an example of the second gear in the present technology. The second counter gear 26 in this example is an example of the third gear in the present technology. Also, the ring gear 28 in this example is an example of the fourth gear in the present technology. In other embodiments of the present technology, the fourth gear may be driven by an electric motor or other prime mover, and power may be transmitted from the fourth gear to the third gear, the second gear, and the first gear in that order.

What is claimed is:

1. A power transmission device comprising:
   a first gear;
   a second gear meshing with the first gear;
   a third gear that rotates integrally with the second gear;
   a fourth gear meshing with the third gear;
   a housing accommodating the first gear, the second gear, the third gear, and the fourth gear; and
   a plate member mounted in the housing, wherein:
   a lubricating liquid is stored in the housing such that a part of the second gear and a part of the fourth gear are immersed therein;
   the plate member includes a catch tank arranged adjacent to the first gear, and a tray extending from the catch tank along the second gear into the lubricating liquid; and
   the catch tank is configured to receive the lubricating liquid drawn up by the fourth gear and guide the lubricating liquid to a meshing portion between the first gear and the second gear.

2. The power transmission device according to claim 1, wherein:
   the fourth gear is located on one side with respect to the meshing portion between the first gear and the second gear in a horizontal direction; and
   the plate member is adjacent to the meshing portion between the first gear and the second gear from another side in the horizontal direction.

3. The power transmission device according to claim 1, wherein the catch tank includes,
   a first catch tank located above the first gear and receiving the lubricating liquid drawn up by the fourth gear, and
   a second catch tank located below the first gear and guiding the lubricating liquid supplied from the first catch tank to the meshing portion.

4. The power transmission device according to claim 3, wherein the first catch tank has a first supply hole used to supply the lubricating liquid to the second catch tank.

5. The power transmission device according to claim 4, wherein the first supply hole is located directly above the first gear.

6. The power transmission device according to claim 4, wherein:
   the first catch tank has a first compartment, a second compartment, and a partition wall that partially isolates the first compartment and the second compartment; and
   the first supply hole is provided in the second compartment.

7. The power transmission device according to claim 3, wherein the first catch tank further includes a second supply hole used to supply the lubricating liquid to a bearing supporting the first gear.

8. The power transmission device according to claim 3, wherein the second catch tank has a shape open toward the meshing portion.

9. The power transmission device according to claim 3, wherein:
- the catch tank further includes a vertical wall extending between the first catch tank and the second catch tank; and
- the vertical wall faces an outer peripheral surface of the first gear.

10. The power transmission device according to claim 3, wherein the tray extends in an arc shape from the second catch tank along an outer peripheral surface of the second gear.

11. A power unit comprising:
- the power transmission device of claim 1; and
- an electric motor driving the first gear of the power transmission device.

12. The power unit according to claim 11, wherein the fourth gear is a ring gear of a differential unit.

* * * * *